US010135828B2

(12) United States Patent
Lenz et al.

(10) Patent No.: US 10,135,828 B2
(45) Date of Patent: *Nov. 20, 2018

(54) TECHNOLOGIES FOR SECURE SERVER ACCESS USING A TRUSTED LICENSE AGENT

(71) Applicant: Intel Corporation, Santa Clara, CA (US)

(72) Inventors: Oron Lenz, Ein-Carmel (IL); Noam Milshten, Ramat-Yishay (IL); Ilya Berdichevsky, Netanya (IL)

(73) Assignee: Intel Corporation, Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/681,955

(22) Filed: Aug. 21, 2017

(65) Prior Publication Data
US 2018/0041513 A1 Feb. 8, 2018

Related U.S. Application Data

(63) Continuation of application No. 14/670,959, filed on Mar. 27, 2015, now Pat. No. 9,749,323.

(51) Int. Cl.
H04L 29/06 (2006.01)
G06F 21/57 (2013.01)
G06F 21/10 (2013.01)

(52) U.S. Cl.
CPC .............. H04L 63/10 (2013.01); G06F 21/10 (2013.01); G06F 21/577 (2013.01); H04L 63/06 (2013.01);
(Continued)

(58) Field of Classification Search
CPC . H04L 63/10; H04L 63/0853; H04L 63/0876; H04L 63/102; H04L 63/06;
(Continued)

(56) References Cited

U.S. PATENT DOCUMENTS 8,601,550 B2 * 12/2013 Hopen ................ H04L 12/2856 709/224
9,749,323 B2 * 8/2017 Lenz ...................... H04L 63/10
(Continued)

FOREIGN PATENT DOCUMENTS

WO 2014/196966 12/2014

OTHER PUBLICATIONS

Extended European Search Report for European Patent App. No. 16773675.0, dated Sep. 28, 2018 (10 pages).

Primary Examiner — Saleh Najjar
Assistant Examiner — Louis C Teng
(74) Attorney, Agent, or Firm — Barnes & Thornburg LLP

(57) ABSTRACT

Technologies for secure server access include a client computing device that loads a license agent into a secure enclave established by a processor of the client computing device. The license agent receives a request from an application to access a remote server device. The license agent opens a secure connection with the server device and performs remote attestation of the secure enclave. The license agent authenticates the user and transmits a machine identifier and a user identifier to the server device. The machine identifier may be based on an enclave sealing key of the client computing device. The server device verifies that the machine identifier and the user identifier are bound to a valid application license. If the machine identifier and the user identifier are successfully verified, the application communicates with the server device using the secure connection. Other embodiments are described and claimed.

17 Claims, 4 Drawing Sheets

(52) U.S. Cl.
CPC .......... *H04L 63/08* (2013.01); *H04L 63/0853* (2013.01); *H04L 63/0876* (2013.01); *H04L 63/102* (2013.01); *H04L 2463/103* (2013.01)

(58) Field of Classification Search
CPC . H04L 63/08; H04L 2463/103; G06F 21/577; G06F 21/10
See application file for complete search history.

(56) References Cited

U.S. PATENT DOCUMENTS

| | | | |
|---|---|---|---|
| 2008/0086777 A1* | 4/2008 | Sanchez | G06F 21/121 726/26 |
| 2012/0166795 A1* | 6/2012 | Wood | G06F 21/57 713/155 |
| 2014/0173709 A1 | 6/2014 | Eldar | |
| 2015/0033012 A1* | 1/2015 | Scarlata | H04L 9/3242 713/161 |
| 2015/0033316 A1* | 1/2015 | Scarlata | H04L 9/3213 726/9 |
| 2015/0121068 A1* | 4/2015 | Lindemann | H04L 63/0823 713/158 |
| 2015/0249617 A1* | 9/2015 | Chang | H04L 47/70 709/225 |
| 2016/0182499 A1* | 6/2016 | Sharaga | H04L 63/0853 713/156 |

\* cited by examiner

TECHNOLOGIES FOR SECURE SERVER ACCESS USING A TRUSTED LICENSE AGENT

CROSS-REFERENCE TO RELATED APPLICATION

The present application is a continuation application of U.S. application Ser. No. 14/670,959, entitled "TECHNOLOGIES FOR SECURE SERVER ACCESS USING A TRUSTED LICENSE AGENT," which was filed on Mar. 27, 2015.

BACKGROUND

Many modern computing applications include online features, allowing the application to access data stored on a remote server. For example, multiplayer games may access a remote server, and many content applications also may access a remote server. Service providers may charge for access to online data and thus may authenticate client applications. Typical solutions may create a trusted communication channel between a client device and the remote server, for example using a secure network connection. However, the client application may be an ordinary, unprotected client application executed by the client device, and thus the server may not be assured of the authenticity of the client application.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
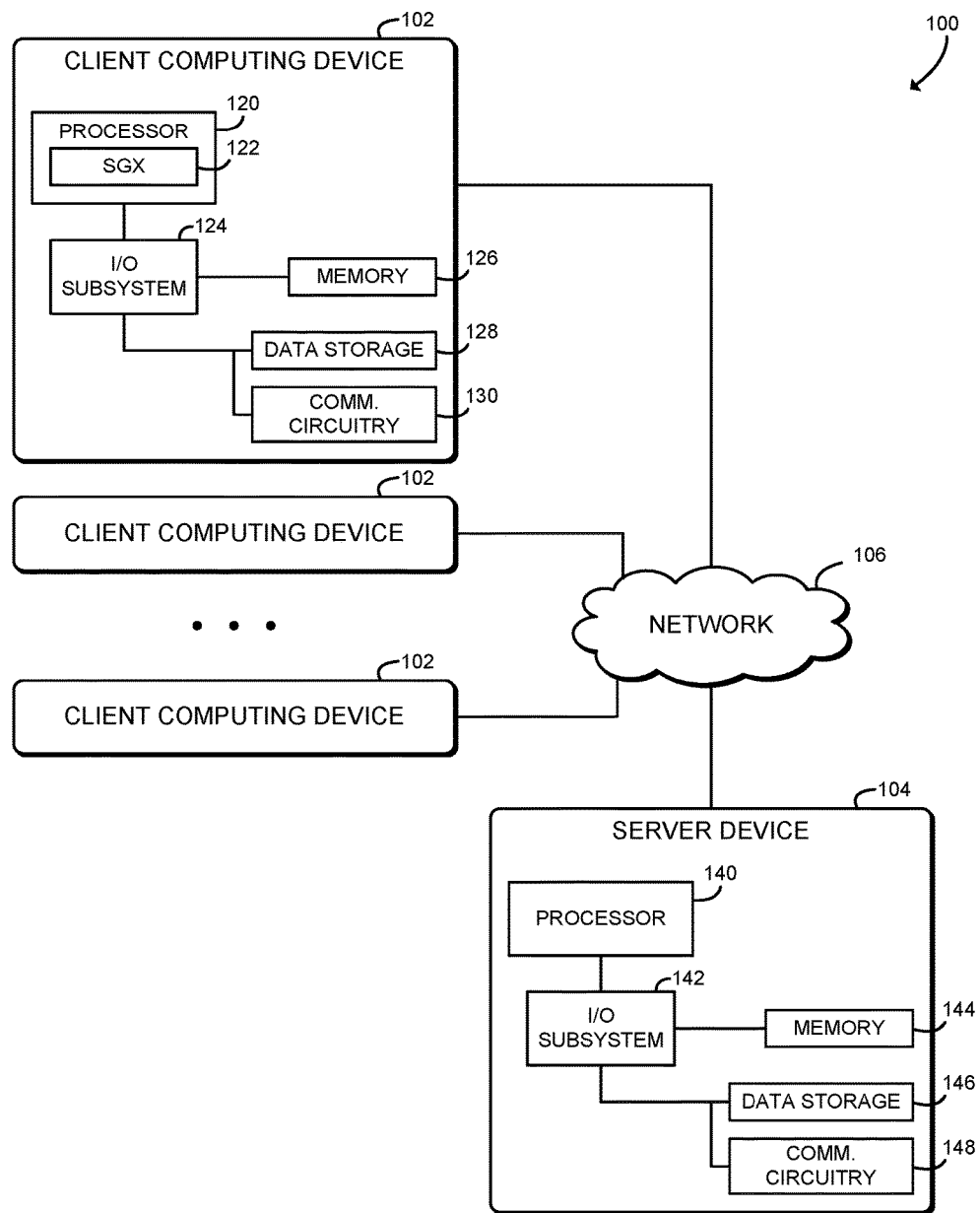
FIG. 1 is a simplified block diagram of at least one embodiment of a system for secure server access.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage media, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, in an illustrative embodiment, a system 100 for secure server access includes several client computing devices 102 and a server device 104 in communication over a network 106. In use, as described in more detail below, each client computing device 102 loads a trusted license agent into a secure enclave protected by a processor of the corresponding client computing device 102. In use, the trusted license agent receives requests from applications executed by the client computing device 102 to access applications and/or data provided by the server device 104. The trusted license agent, executing within the secure enclave, opens a secure connection with the server device 104 and performs a remote attestation procedure to prove that the secure enclave (and therefore the license agent) is intact and authentic. After remote attestation, the trusted license agent transmits a machine identifier associated with the client computing device 102 and a user identifier to the server device 104, and the server device 104 determines whether that combination of user and machine is allowed to access the application and/or data. If access is granted, the application of the client computing device 102 accesses the server device 104 through the secure connection established by the trusted license agent. Thus, the system 100 allows the server device 104 to limit access to an application to particular combinations of machine and user. Additionally, the server device 104 verifies the integrity of applications executed by the client computing devices 102, which may prevent access by unauthorized clients (e.g., by preventing access by modified or otherwise compromised client applications).

Each client computing device 102 may be embodied as any type of computation or computer device capable of performing the functions described herein, including, without limitation, a computer, a desktop computer, a workstation, a laptop computer, a notebook computer, a tablet computer, a mobile computing device, a wearable computing device, a network appliance, a web appliance, a distributed computing system, a processor-based system, and/or a consumer electronic device. As shown in FIG. 1, the client computing device 102 illustratively includes a processor 120, an input/output subsystem 124, a memory 126, a data storage device 128, and communication circuitry 130. Of course, the client computing device 102 may include other or additional components, such as those commonly found in a desktop computer (e.g., various input/output devices), in other embodiments. Additionally, in some embodiments, one or more of the illustrative components may be incorporated in, or otherwise form a portion of, another component. For example, the memory 126, or portions thereof, may be incorporated in one or more processors 120 in some embodiments.

The processor 120 may be embodied as any type of processor capable of performing the functions described herein. The processor 120 may be embodied as a single or multi-core processor(s), digital signal processor, microcontroller, or other processor or processing/controlling circuit. In some embodiments, the processor 120 includes secure enclave support 122. The secure enclave support 122 allows the processor 120 to establish a trusted execution environment known as a secure enclave, in which executing code may be measured, verified, and/or otherwise determined to be authentic. Additionally, code and data included in the secure enclave may be encrypted or otherwise protected from being accessed by code executing outside of the secure enclave. For example, code and data included in the secure enclave may be protected by hardware protection mechanisms of the processor 120 while being executed or while being stored in certain protected cache memory of the processor 120. The code and data included in the secure enclave may be encrypted when stored in a shared cache or the main memory 126. The secure enclave support 122 may be embodied as a set of processor instruction extensions that allows the processor 120 to establish one or more secure enclaves in the memory 126. For example, the secure enclave support 122 may be embodied as Intel® Software Guard Extensions (SGX) technology.

The memory 126 may be embodied as any type of volatile or non-volatile memory or data storage capable of performing the functions described herein. In operation, the memory 126 may store various data and software used during operation of the client computing device 102 such as operating systems, applications, programs, libraries, and drivers. The memory 126 is communicatively coupled to the processor 120 via the I/O subsystem 124, which may be embodied as circuitry and/or components to facilitate input/output operations with the processor 120, the memory 126, and other components of the client computing device 102. For example, the I/O subsystem 124 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 124 may form a portion of a system-on-a-chip (SoC) and be incorporated, along with the processors 120, the memory 126, and other components of the client computing device 102, on a single integrated circuit chip.

The data storage device 128 may be embodied as any type of device or devices configured for short-term or long-term storage of data such as, for example, memory devices and circuits, memory cards, hard disk drives, solid-state drives, or other data storage devices. In some embodiments, the data storage device 128 may be used to store the contents of one or more secure enclaves. When stored by the data storage device 128, the contents of the secure enclave may be encrypted to prevent unauthorized access.

The communication circuitry 130 of the client computing device 102 may be embodied as any communication circuit, device, or collection thereof, capable of enabling communications between the client computing device 102, the server device 104, and/or other remote devices over the network 106. The communication circuitry 130 may be configured to use any one or more communication technology (e.g., wired or wireless communications) and associated protocols (e.g., Ethernet, Bluetooth®, Wi-Fi®, WiMAX, etc.) to effect such communication.

The server device 104 is configured to verify and provide application services and/or data to a trusted license agent of each client computing device 102. The server device 104 may be embodied as any type of computation or computer device capable of performing the functions described herein, including, without limitation, a computer, a multiprocessor system, a server, a rack-mounted server, a blade server, a laptop computer, a notebook computer, a tablet computer, a wearable computing device, a network appliance, a web appliance, a distributed computing system, a processor-based system, and/or a consumer electronic device. Illustratively, the server device 104 includes a processor 140, an I/O subsystem 142, a memory 144, a data storage device 146, communication circuitry 148, and/or other components and devices commonly found in a server or similar computing device. Those individual components of the server device 104 may be similar to the corresponding components of the client computing device 102, the description of which is applicable to the corresponding components of the server device 104 and is not repeated herein so as not to obscure the present disclosure. Additionally, in some embodiments, the server device 104 may be embodied as a "virtual server" formed from multiple computing devices distributed across the network 106 and operating in a public or private cloud. Accordingly, although the server device 104 is illustrated in FIG. 1 as embodied as a single server computing device, it should be appreciated that the server device 104 may be embodied as multiple devices cooperating together to facilitate the functionality described below.

As discussed in more detail below, the client computing devices 102 and the server device 104 may be configured to transmit and receive data with each other and/or other devices of the system 100 over the network 106. The network 106 may be embodied as any number of various wired and/or wireless networks. For example, the network 106 may be embodied as, or otherwise include, a wired or wireless local area network (LAN), a wired or wireless wide area network (WAN), a cellular network, and/or a publicly-accessible, global network such as the Internet. As such, the network 106 may include any number of additional devices, such as additional computers, routers, and switches, to facilitate communications among the devices of the system 100.

Figure 2:
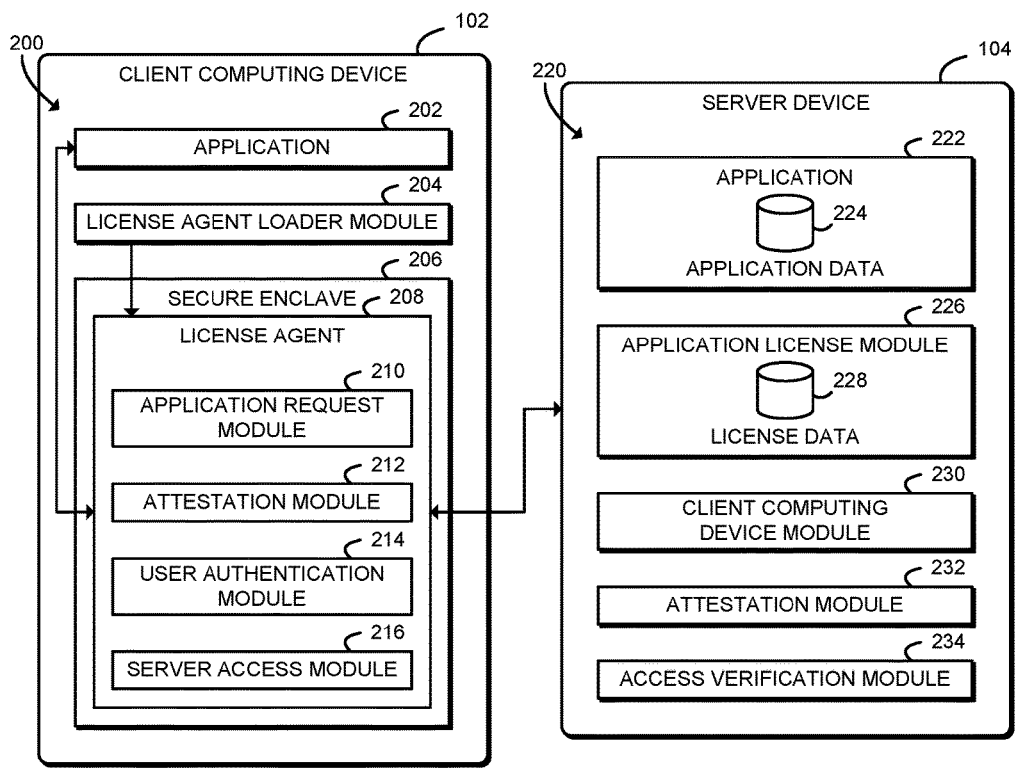
FIG. 2 is a simplified block diagram of at least one embodiment of various environments that may be established by the system of FIG. 1.

Referring now to FIG. 2, in an illustrative embodiment, a client computing device 102 establishes an environment 200 during operation. The illustrative environment 200 includes an application 202, a license agent loader module 204, and a secure enclave 206. The various modules of the environment 200 may be embodied as hardware, firmware, software, or a combination thereof. For example the various modules, logic, and other components of the environment 200 may form a portion of, or otherwise be established by, the processor 120 or other hardware components of the client computing device 102. As such, in some embodiments, any one or more of the modules of the environment 200 may be embodied as a circuit or collection of electrical devices (e.g., a license agent loader circuit, a secure enclave circuit, etc.).

The application 202 may be embodied as any user application, system application, module, script, or other computer program that is configured to access services or data provided by the server device 104. The application 202 may be embodied as a native application, a web application, bytecode, source code, or any other code that may be executed by the client computing device 102. For example, the application 202 may be embodied as a content application (e.g., a news portal, a mapping application, a travel guide, a health portal, a financial portal, etc.) that accesses data stored by the server device 104. As another example, the application 202 may be embodied as a game that accesses game state maintained by the server device 104.

The license agent loader module 204 is configured to load a license agent 208 into the secure enclave 206 established by the processor 120 of the client computing device 102. The license agent loader module 204 may be included or installed with the application 202. The license agent loader module 204 executes outside of the secure enclave 206 and thus may not be secure or otherwise verified by the client computing device 102.

The secure enclave 206 is configured to provide an isolated and secure execution environment within the environment 200. In some embodiments, the secure enclave 206 may be embodied as a software-based trusted execution environment; that is, a trusted execution environment that securely executes software using the processor 120 of the client computing device 102. For example, the secure enclave 206 may be embodied as one or more secure enclaves established using the secure enclave support 122 of the processor 120, such as a secure enclave established using Intel® SGX technology. The secure enclave 206 further establishes the license agent 208. The illustrative license agent 208 includes an application request module 210, an attestation module 212, a user authentication module 214, and a server access module 216. The various modules and components of the secure enclave 206 may be embodied as hardware, firmware, software, or a combination thereof. For example the various modules, logic, and other components of the secure enclave 206 may form a portion of, or otherwise be established by, the processor 120 or other hardware components of the client computing device 102. As such, in some embodiments, any one or more of the modules of the secure enclave 206 may be embodied as a circuit or collection of electrical devices (e.g., a license agent circuit, an application request circuit, an attestation circuit, etc.).

The application request module 210 is configured to receive a request to access the remote server device 104 from the application 202. The application request module 210 may be configured to open a secure connection with the remote server device 104 in response to receipt of the request to access the remote server device 104.

The attestation module 212 is configured to perform remote attestation of the secure enclave 206 with the remote server device 104 using the secure connection between the client computing device 102 and the remote server device 104. Remote attestation may include generating a measurement of the secure enclave 206 and transmitting that measurement to the remote server device 104. The measurement may be indicative of a security log associated with the secure enclave 206, and the security log may be indicative of the contents of the secure enclave 206 and the order of creation of the secure enclave 206.

The user authentication module 214 is configured to authenticate the user of the computing device 102. The user authentication module 214 may be configured to receive user credentials from the user, and in some embodiments may receive the credentials using a trusted I/O path of the client computing device 102.

The server access module 216 is configured to transmit a machine identifier and a user identifier to the remote server device 104 using the secure connection after authenticating the user. The server access module 216 is further configured to allow the application 202 to access the secure connection with the remote server device 104 after transmitting the machine identifier and the user identifier and, in some embodiments, receiving a successful response from the remote server device 104. The machine identifier may be embodied as any type of data that is configured to securely and uniquely identify a particular computing device 102. The server access module 216 may be configured to generate the machine identifier as a function of a unique key that is unique to a combination of the particular secure enclave 206 and client computing device 102. For example, the unique key may be embodied as an enclave sealing key. Similarly, the user identifier may be embodied as any credentials or other type of data that is configured to identify a particular user of the computing device 102.

Still referring to FIG. 2, in the illustrative embodiment, the server device 104 establishes an environment 220 during operation. The illustrative environment 220 includes an application 222, an application license module 226, a client computing device module 230, an attestation module 232, and an access verification module 234. The various modules of the environment 220 may be embodied as hardware, firmware, software, or a combination thereof. For example the various modules, logic, and other components of the environment 220 may form a portion of, or otherwise be established by, the processor 140 or other hardware components of the server device 104. As such, in some embodiments, any one or more of the modules of the environment 220 may be embodied as a circuit or collection of electrical devices (e.g., an application license circuit, a client computing device circuit, etc.).

The application 222 may be embodied as any user application, system application, module, script, or other computer program that is configured to provide services or data to the client computing device 102. The application 222 may be embodied as a native application, a web application, bytecode, source code, or any other code that may be executed by the server device 104. For example, the application 222 may be embodied as a content portal, an online game, or other application. As shown, the application 222 may store, maintain, or otherwise access application data 224, which may include content data, game state data, or other data used by the application 222.

The application license module 226 is configured to bind a machine identifier and a user identifier to an application license. As discussed above, the machine identifier is indicative of a combination of a particular client computing device 102 and a secure enclave 206 established by the processor 120 of the client computing device 102. The machine identifier may be generated as a function of a unique key that is unique to the combination of the client computing device 102 and the secure enclave 206 of the client computing device 102 such as, for example, an enclave sealing key. The application license module 226 may be configured to transmit a server challenge data item to the client computing device 102, and the machine identifier may be further indicative of the server challenge data item. The application license module 226 may be configured to receive the machine identifier and the user identifier from the client computing device 102. The machine identifier and/or the user identifier may be stored in or otherwise associated with license data 228.

The client computing device module 230 is configured to open a secure connection with the client computing device 102 after the machine identifier and the user identifier are bound to the application license. As described further below, the client computing device module 230 is configured to allow the client computing device 102 to access the application 222 and/or the application data 224 using the secure connection after successful remote attestation of the secure enclave 206 and successful verification of a machine identifier and user identifier supplied by the client computing device 102.

The attestation module 232 is configured to perform remote attestation of the secure enclave 206 of the client computing device 102 using the secure connection. Remote attestation may include receiving a measurement of the secure enclave 206 and verifying that the secure enclave 206 is intact based on that measurement. The measurement of the secure enclave 206 may be indicative of a security log associated with the secure enclave 206, and the security log may be indicative of the contents of the secure enclave 206 and the order of creation of the secure enclave 206.

The access verification module 234 is configured to receive a machine identifier and a user identifier from the client computing device 102 using the secure connection and verify the machine identifier and the user identifier. The access verification module 234 may be configured to determine whether the machine identifier and the user identifier match the machine identifier and user identifier previously bound to the application license. As described above, after successful verification of the machine identifier and the user identifier, the client computing device 102 may access the application 222 and/or the application data 224 using the secure connection.

Figure 3:
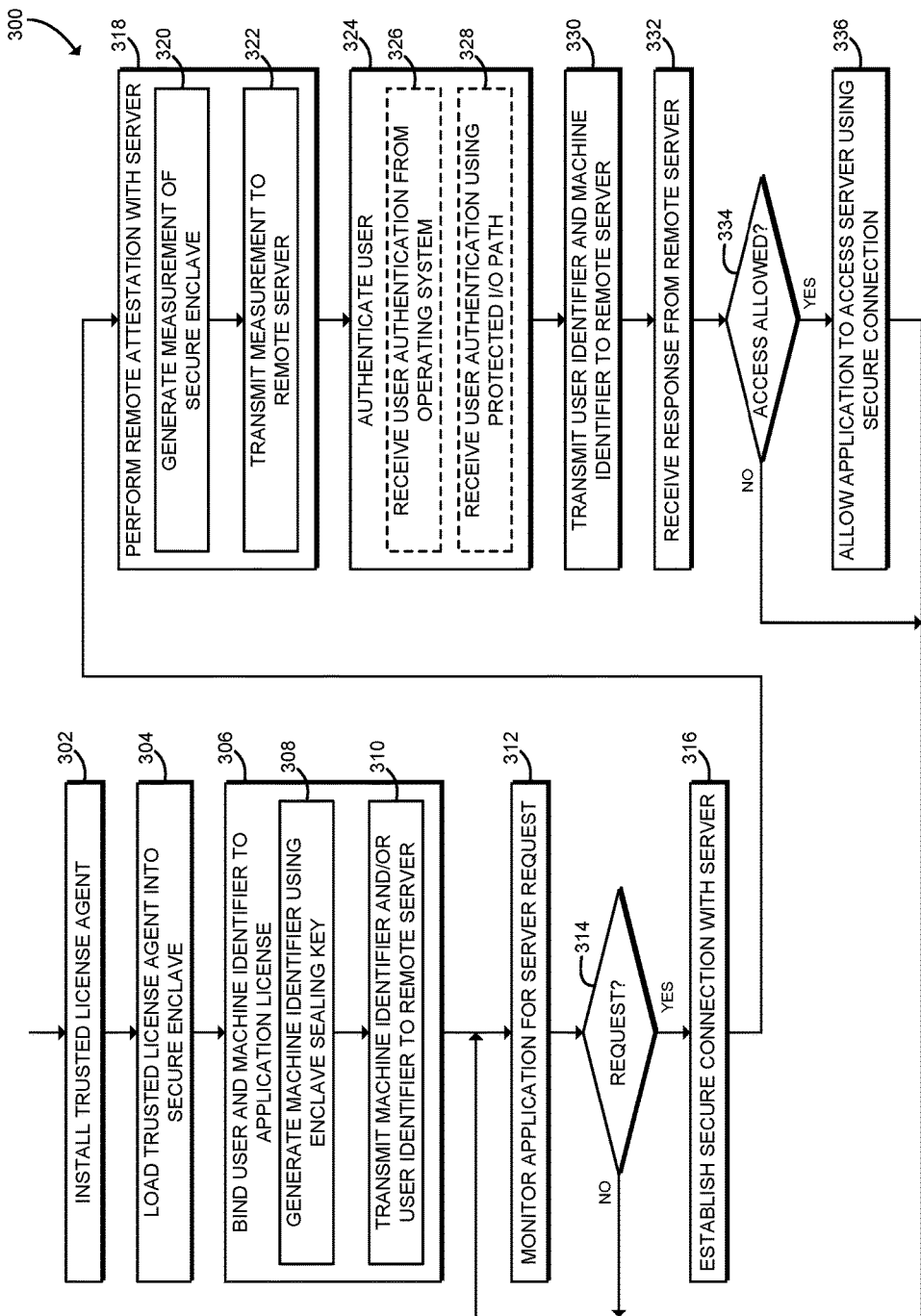
FIG. 3 is a simplified flow diagram of at least one embodiment of a method for secure server access that may be executed by a client computing device of the system of FIGS. 1 and 2.

Referring now to FIG. 3, in use, a client computing device 102 may execute a method 300 for secure server access. The method 300 begins with block 302, in which the client computing device 102 installs a trusted license agent 208 for the application 202. The trusted license agent 208 may be installed with or installed as a part of the application 202. The code and/or data associated with the trusted license agent 208 may be included with the application 202, and may be communicated and/or stored in an unprotected format (e.g., without encryption).

In block 304, the client computing device 102 loads the trusted license agent 208 into the secure enclave 206. After being loaded into the secure enclave 206, the trusted license agent 208 may not be tampered with or otherwise accessed by unauthorized processes of the client computing device 102. Additionally, as described further below, after being loaded into the secure enclave 206, the trusted license agent 208 may be verified to be unaltered using a remote attestation procedure. In the illustrative embodiment, the secure enclave 206 remains open and the trusted license agent 208 remains loaded during execution of the method 300. However, in some embodiments, the trusted license agent 208 may be unloaded (e.g., encrypted and swapped to disk or closed out of memory entirely) and then securely reloaded into the secure enclave 206 as needed.

The client computing device 102 may use any appropriate technique to load the trusted license agent 208 into the secure enclave 206. For example, the client computing device 102 may establish one or more secure enclaves within the memory 126 using the secure enclave support 122 of the processor 120. The secure enclave may be established, for example, using Intel® SGX technology. To establish a secure enclave, the client computing device 102 may execute one or more processor instructions to create the secure enclave, add memory pages to the secure enclave, and finalize measurements of the secure enclave. As memory pages are added into the secure enclave, the secure enclave support 122 may update a security log based on the contents of the memory pages and the order that the memory pages are added. Finalizing the secure enclave may generate a measurement based on the security log, for example by generating a secure hash value based on the security log. Additional memory pages may not be added to the secure enclave after the secure enclave is finalized. The measurement of the secure enclave may be used to identify and distinguish between different secure enclaves established by the client computing device 102.

In block 306, the client computing device 102 binds a user identifier and a machine identifier to a license for the application 202. The user identifier may be embodied as any user credentials or other data identifying a particular user of the client computing device 102. The user identifier may include an authentication factor such as a password used to authenticate the user. The machine identifier may be embodied as any data that securely and uniquely identifies the particular client computing device 102. The user identifier and the machine identifier may be bound to the application license prior to executing the application 202, for example during installation of the application 202 or during another provisioning process. In some embodiments, in block 308 the client computing device 102 may generate the machine identifier using an enclave sealing key. The enclave sealing key may be embodied as a secret cryptographic key embedded in the secure enclave support 122 at the time of manufacture. The enclave sealing key may be used by the processor 120 to encrypt data associated with the secure enclave 206 prior to that data leaving the processor 120. The machine identifier may be generated as a cryptographic hash, signature, derived key, or other data derived from the enclave sealing key. In some embodiments, the machine identifier may be generated as the cryptographic hash of the enclave sealing key and a server challenge data item received from the server device 104. In block 310 the client computing device 102 transmits the machine identifier and/or the user identifier to the server device 104.

In block 312, the client computing device 102 monitors the application 202 for a request to access the server device 104. The client computing device 102 may use any technique for monitoring for requests to access the server device 104. For example, the application 202 may issue a request to the trusted license agent 208 of the secure enclave 206, for example using a network request or other inter-process communication channel. As another example, the trusted license agent 208 of the secure enclave 206 may intercept a request generated by the application 202. In block 314, the client computing device 102 determines whether a request has been generated by the application 202. If not, the method 300 loops back to block 312 to continue monitoring for requests. If a request to the server device 104 has been generated, the method 300 advances to block 316.

In block 316, the trusted license agent 208 of the client computing device 102 establishes a secure network connection with the server device 104. The secure network connection allows the trusted license agent 208, executing within the secure enclave 206, to communicate securely with the remote server device 104. The secure network connection may be established using any appropriate communication protocol or other technique. For example, the secure network connection may be established using the SSL/TLS protocol.

In block 318, the client computing device 102 performs remote attestation of the secure enclave 206 with the remote server device 104. Remote attestation proves to the server device 104 that trusted license agent 208 is executing in a valid secure enclave 206, and that the trusted license agent 208 is authentic (i.e., the trusted license agent 208 has not been tampered with). To perform remote attestation, the client computing device 102 may perform an Intel® SGX technology secure enclave remote attestation flow.

In block 320, the client computing device 102 generates a measurement of the secure enclave 206. The measurement may be embodied as a cryptographically secure value that depends on the contents of memory pages added to the secure enclave 206 as well as the order that the memory pages were added to the secure enclave 206. For example, the measurement may be embodied as a cryptographic hash of a security log generated during construction of the secure enclave 206. The measurement may be generated using a specialized processor instruction of the processor 120, such as the EREPORT instruction. The measurement may also be bound to the hardware of the client computing device 102. For example, the measurement may include a message authentication code (MAC) generated using an encryption key (e.g., a report key) associated with a particular secure enclave established by the client computing device 102. In some embodiments, the client computing device 102 may replace the MAC of the measurement with a signature created using a device-specific, private key associated with the client computing device 102. After generating the measurement, in block 322, the client computing device 102 transmits the measurement to the server device 104 via the secure network connection. As described further below, the server device 104 may use the measurement to verify that the secure enclave 206 is a valid secure enclave and that the trusted license agent 208 is authentic.

In block 324, the client computing device 102 authenticates the user of the client computing device 102. Authentication of the user is performed by the trusted license agent 208 from within the secure enclave 206. After authenticating the user, the client computing device 102 generates a user identifier, such as user credentials, associated with the authenticated user. The client computing device 102 may use any technique to authenticate the user. In some embodiments, in block 326, the client computing device 102 may receive user authentication data from an operating system or other ordinary software of the client computing device 102. For example, the trusted license agent 208 may receive user authentication credentials or other authentication factors collected from an interactive login prompt provided by the operating system. In those embodiments, the security of the user authentication process depends on the level of security provided by the operating system. Additionally or alternatively, in some embodiments in block 328 the client computing device 102 may receive the user authentication data using a protected I/O path. For example, the client computing device 102 may receive the authentication data from a trusted input device such as a trusted PIN pad. As another example, the client computing device 102 may display a scrambled PIN pad using a protected audio/video path (e.g., Intel® PAVP) and receive user input based on the scrambled PIN pad. In those embodiments, the protected I/O path may provide additional security beyond that provided by the operating system.

In block 330, the client computing device 102 transmits the user identifier and the machine identifier to the server device 104 via the secure connection. As described above, the user identifier is based on the results of user authentication. Similarly, as described above, the machine identifier uniquely identifies the client computing device 102. In some embodiments, the machine identifier may also identify the secure enclave 206 and the trusted license agent 208. As further described below, the server device 104 may determine whether the particular combination of user and machine described by the user identifier and the machine identifier is allowed to access the application 222 and/or the application data 224 maintained by the server device 104.

In block 332, the client computing device 102 receives a response from the server device 104 indicating whether access to the application 222 and/or the application data 224 has been allowed. In block 334, the client computing device 102 determines whether access has been allowed based on the response from the server device 104. If not, the method 300 loops back to block 312 to continue monitoring for requests to access the server device 104. If access has been allowed, the method 300 advances to block 336. In block 336, the client computing device 102 allows the application 202 to access the server device 104 using the secure network connection. The application 202 may issue requests to and receive data from the server device 104 via the secure network connection established by the trusted license agent 208. After allowing access to the secure network connection, the method 300 loops back to block 312 to continue monitoring for requests to access the server device 104.

Figure 4:
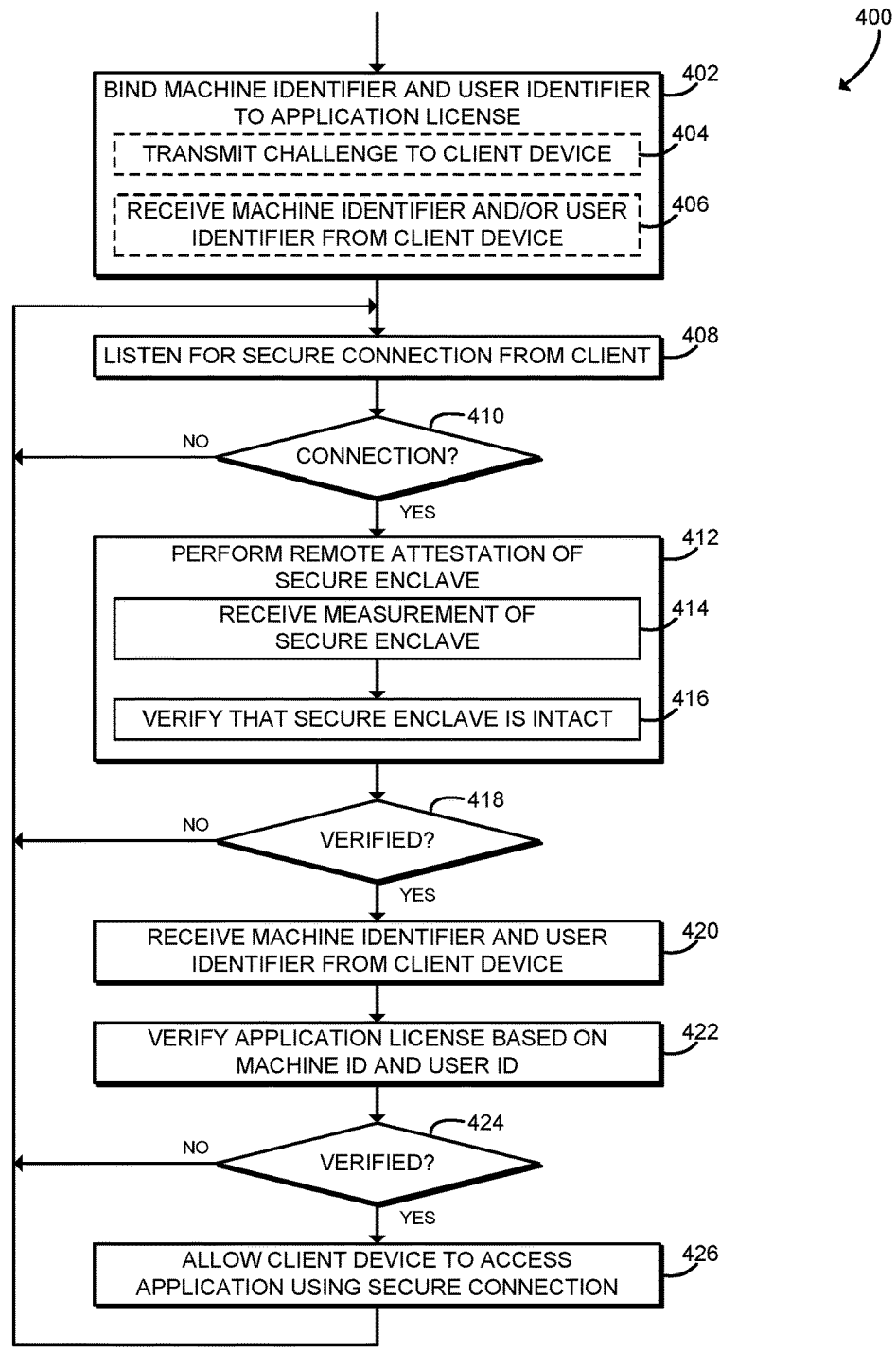
FIG. 4 is a simplified flow diagram of at least one embodiment of a method for secure server access that may be executed by a server device of the system of FIGS. 1 and 2.

Referring now to FIG. 4, in use, the server device 104 may execute a method 400 for secure server access. The method 400 begins with block 402, in which the server device 104 binds a machine identifier and a user identifier to a license for the application 202 executed by a client computing device 102. The server device 104 may associate a particular combination of user identifier and machine identifier with the application license, for example by storing the user identifier and machine identifier in the license data 228. As described above, the user identifier may be embodied as any user credentials or other data identifying a particular user of the client computing device 102. The machine identifier may be embodied as any data that securely and uniquely identifies the particular client computing device 102. In some embodiments, the machine identifier may also identify the secure enclave 206 and the license agent 208 of the client computing device 102. For example, the machine identifier may be derived from or otherwise based on an enclave sealing key embedded in the secure enclave support 122 of the client computing device 102 at the time of manufacture. In some embodiments, the server device 104 may bind the user identifier and the machine identifier to the application license prior to servicing any requests from the client computing device 102, for example as part of a provisioning process. Additionally or alternatively, the server device 104 may communicate with the client computing device 102 to bind the user identifier and the machine identifier to the application license.

In some embodiments, in block 404 the server device 104 may transmit a server challenge data item to the client computing device 102. The challenge data item may be embodied as any timestamp, nonce, random value, or other value known to the server device 104 and may be used to protect against replay attacks. The machine identifier may be generated as a function of the server challenge data item. For example, the machine identifier may be embodied as the cryptographic hash of the server challenge data item and the enclave sealing key of the client computing device 102. In some embodiments, in block 406, the server device 104 may receive the machine identifier and/or the user identifier from the client computing device 102. Additionally or alternatively, in some embodiments the server device 104 may be configured with or receive the machine identifier and/or the user identifier from a different source, such as an enterprise directory server.

In block 408, the server device 104 listens for a secure network connection opened by the client computing device 102. In block 410, the server device 104 determines whether a secure connection has been opened with the client computing device 102. If not, the method 400 loops back to block 408 to continue monitoring for secure connections. If a secure connection has been opened, the method 400 advances to block 412.

In block 412, the server device 104 performs remote attestation with the client computing device 102. As described above, remote attestation allows the server device 104 to verify that the trusted license agent 208 executed by the client computing device 102 is executing in a valid secure enclave 206, and that the trusted license agent 208 is authentic (i.e., the trusted license agent 208 has not been tampered with). To perform remote attestation, the server device 104 may perform an Intel® SGX technology secure enclave remote attestation flow.

In block 414, the server device 104 receives a measurement of the secure enclave 206 from the client computing device 102. As described above, the measurement may be embodied as a secure value that depends on the contents of the memory pages added to the secure enclave 206 as well as the order that the memory pages were added to the secure enclave 206. For example, the measurement may be embodied as a cryptographic hash of a security log generated during construction of the secure enclave 206. The measurement may be generated using a specialized processor instruction of the processor 120 of the client computing device 102, such as the EREPORT instruction. The measurement may also be bound to the hardware of the client computing device 102. For example, the measurement may include a message authentication code (MAC) generated using an encryption key (e.g., a report key) associated with a particular secure enclave established by the client computing device 102. In some embodiments, the client computing device 102 may replace the MAC of the measurement with a signature created using a device-specific, private key associated with the client computing device 102. After receiving the measurement, in block 416, the server device 104 verifies that the secure enclave is intact based on the measurement. The server device 104 may, for example, compare a message authentication code, signature, or other data included in the measurement with an expected value.

In block 418, the server device 104 determines whether the secure enclave 206 of the client computing device 102 was successfully verified. If not, the method 400 loops back to block 408 to listen for additional secure connections. In some embodiments, the server device 104 may close the secure connection, transmit a negative response to the client computing device 102, log an error, or perform any other appropriate security response based on the failure to verify the secure enclave 206. If the secure enclave 206 was successfully verified, the method 400 advances to block 420.

In block 420, the server device 104 receives a machine identifier and a user identifier from the client computing device 102. As described above, the machine identifier uniquely describes the particular client computing device 102 and may be bound to the hardware of the client computing device 102, for example by being derived from an enclave sealing key. The user identifier describes the currently authenticated user of the client computing device 102 and may include or be derived from user authentication factors such as user credentials.

In block 422, the server device 104 verifies the application license based on the machine identifier and the user identifier. The server device 104 may determine whether the particular combination of the machine identifier and the user identifier have been authorized to access the application 222 and/or the application data 224. The server device 104 may, for example, search the license data 228 using the machine identifier and/or the user identifier. In block 424, the server device 104 determines whether the application license has been verified. If not, the method 400 loops back to block 408 to listen for additional secure connections. In some embodiments, the server device 104 may close the secure connection, transmit a negative response to the client computing device 102, log an error, or perform any other appropriate security response based on the failure to verify the application license. If the application license was successfully verified, the method 400 advances to block 426.

In block 426, the server device 104 allows the client computing device 102 to access the application 222 and/or the application data 224 using the secure network connection. The data transmitted to the client computing device 102 is protected in transit by the secure network connection. The client computing device 102 may continue to access the application 222 and/or the application data 224 using the secure network connection for the lifetime of the application session. After allowing the client computing device 102 to access the application 222 and/or the application data 224, the method 400 loops back to block 408 to listen for additional secure connections.

EXAMPLES

Illustrative examples of the technologies disclosed herein are provided below. An embodiment of the technologies may include any one or more, and any combination of, the examples described below.

Example 1 includes a computing device for secure server access, the computing device comprising a processor that includes secure enclave support; a license agent loader module to load a license agent into a secure enclave; an application request module to receive, by the license agent, a request to access a remote server from an application of the computing device; an attestation module to perform, by the license agent, remote attestation of the secure enclave with the remote server via secure connection between the license agent and the remote server; a user authentication module to authenticate, by the license agent, a user of the computing device; and a server access module to (i) transmit, by the license agent, a machine identifier and a user identifier to the remote server via the secure connection in response to authentication of the user, wherein the machine identifier identifies the computing device and the user identifier identifies the user of the computing device; and (ii) allow, by the license agent, the application to access the secure connection with the remote server in response to authentication of the machine identifier and the user identifier.

Example 2 includes the subject matter of Example 1, and wherein the application request module is further to open, by the license agent, the secure connection with the remote server in response to receipt of the request to access the remote sever.

Example 3 includes the subject matter of any of Examples 1 and 2, and wherein the server access module is further to receive, by the license agent, a successful response from the remote server in response to transmission of the machine identifier and the user identifier; wherein to allow the application to access the secure connection in response to authentication of the machine identifier and the user identifier comprises to allow the application to access the secure connection in response to receipt of the successful response.

Example 4 includes the subject matter of any of Examples 1-3, and wherein the server access module is further to generate, by the license agent, the machine identifier as a function of a unique key, wherein the unique key is unique to a combination of the secure enclave and the computing device.

Example 5 includes the subject matter of any of Examples 1-4, and wherein the unique key comprises an enclave sealing key.

Example 6 includes the subject matter of any of Examples 1-5, and wherein to generate the machine identifier further comprises to generate the machine identifier as a function of a server challenge data item received from the remote server.

Example 7 includes the subject matter of any of Examples 1-6, and wherein to perform remote attestation of the secure enclave comprises to generate, by the license agent, a measurement of the secure enclave; and transmit, by the license agent, the measurement of the secure enclave to the remote server.

Example 8 includes the subject matter of any of Examples 1-7, and wherein to generate the measurement of the secure enclave comprises to generate a measurement indicative of a security log associated with the secure enclave, wherein the security log is indicative of contents of the secure enclave and an order of creation of the secure enclave.

Example 9 includes the subject matter of any of Examples 1-8, and wherein to authenticate the user of the computing device comprises to receive user credentials from the user.

Example 10 includes the subject matter of any of Examples 1-9, and wherein to receive the user credentials from the user comprises to receive the user credentials using a trusted I/O path of the computing device.

Example 11 includes a computing device for secure server access, the computing device comprising an application license module to bind a first machine identifier and a first user identifier to an application license, wherein the first machine identifier identifies a particular combination of a client computing device and a secure enclave established by a processor of the client computing device and the first user identifier identifies a particular user of the client computing device; a client computing device module to open a secure connection with the client computing device; an attestation module to perform remote attestation of the secure enclave of the client computing device via the secure connection; and an access verification module to (i) receive a second machine identifier and a second user identifier from the client computing device via the secure connection and (ii) determine whether the second machine identifier matches the first machine identifier and whether the second user identifier matches the first user identifier; wherein the client computing device module is further to allow the client computing device to access data of the computing device via the secure connection in response to (i) performance of the remote attestation of the secure enclave and (ii) a determination that the second machine identifier matches the first machine identifier and that the second user identifier matches the first user identifier.

Example 12 includes the subject matter of Example 11, and wherein to allow the client computing device to access the data comprises to transmit a successful response to the client computing device.

Example 13 includes the subject matter of any of Examples 11 and 12, and wherein the first machine identifier is generated as a function of a unique key, wherein the unique key is unique to the combination of the client computing device and the secure enclave of the client computing device.

Example 14 includes the subject matter of any of Examples 11-13, and wherein the unique key comprises an enclave sealing key.

Example 15 includes the subject matter of any of Examples 11-14, and wherein to bind the first machine identifier and the first user identifier to the application license comprises to receive the first machine identifier and the first user identifier from the client computing device.

Example 16 includes the subject matter of any of Examples 11-15, and wherein to bind the first machine identifier and the first user identifier to the application license comprises to transmit a server challenge data item to the client computing device, wherein the machine identifier is further indicative of the server challenge data item.

Example 17 includes the subject matter of any of Examples 11-16, and wherein to perform remote attestation of the secure enclave of the client computing device comprises to receive, via the secure connection, a measurement of the secure enclave; and verify that the secure enclave is intact based on the measurement of the secure enclave.

Example 18 includes the subject matter of any of Examples 11-17, and wherein the measurement of the secure enclave is indicative of a security log associated with the secure enclave, wherein the security log is indicative of contents of the secure enclave and an order of creation of the secure enclave.

Example 19 includes a method for secure server access, the method comprising loading, by a computing device, a license agent into a secure enclave established by a processor of the computing device; receiving, by the license agent, a request to access a remote server from an application of the computing device; performing, by the license agent, remote attestation of the secure enclave with the remote server via secure connection between the license agent and the remote server; authenticating, by the license agent, a user of the computing device; transmitting, by the license agent, a machine identifier and a user identifier to the remote server via the secure connection in response to authenticating the user, wherein the machine identifier identifies the computing device and the user identifier identifies the user of the computing device; and allowing, by the license agent, the application to access the secure connection with the remote server in response to authenticating the machine identifier and the user identifier.

Example 20 includes the subject matter of Example 19, and further including opening, by the license agent, the secure connection with the remote server in response to receiving the request to access the remote sever.

Example 21 includes the subject matter of any of Examples 19 and 20, and further including receiving, by the license agent, a successful response from the remote server in response to transmitting the machine identifier and the user identifier; wherein allowing the application to access the secure connection in response to authenticating the machine identifier and the user identifier comprises allowing the application to access the secure connection in response to receiving the successful response.

Example 22 includes the subject matter of any of Examples 19-21, and further including generating, by the license agent, the machine identifier as a function of a unique key, wherein the unique key is unique to a combination of the secure enclave and the computing device.

Example 23 includes the subject matter of any of Examples 19-22, and wherein the unique key comprises an enclave sealing key.

Example 24 includes the subject matter of any of Examples 19-23, and wherein generating the machine identifier further comprises generating the machine identifier as a function of a server challenge data item received from the remote server.

Example 25 includes the subject matter of any of Examples 19-24, and wherein performing remote attestation of the secure enclave comprises generating, by the license agent, a measurement of the secure enclave; and transmitting, by the license agent, the measurement of the secure enclave to the remote server.

Example 26 includes the subject matter of any of Examples 19-25, and wherein generating the measurement of the secure enclave comprises generating a measurement indicative of a security log associated with the secure enclave, wherein the security log is indicative of contents of the secure enclave and an order of creation of the secure enclave.

Example 27 includes the subject matter of any of Examples 19-26, and wherein authenticating the user of the computing device comprises receiving user credentials from the user.

Example 28 includes the subject matter of any of Examples 19-27, and wherein receiving the user credentials from the user comprises receiving the user credentials using a trusted I/O path of the computing device.

Example 29 includes a method for secure server access, the method comprising binding, by a computing device, a first machine identifier and a first user identifier to an application license, wherein the first machine identifier identifies a particular combination of a client computing device and a secure enclave established by a processor of the client computing device and wherein the first user identifier identifies a particular user of the client computing device; opening, by the computing device, a secure connection with the client computing device; performing, by the computing device, remote attestation of the secure enclave of the client computing device via the secure connection; receiving, by the computing device, a second machine identifier and a second user identifier from the client computing device via the secure connection; determining, by the computing device, whether the second machine identifier matches the first machine identifier and whether the second user identifier matches the first user identifier; and allowing, by the computing device, the client computing device to access data of the computing device via the secure connection in response to (i) performing the remote attestation of the secure enclave and (ii) determining that the second machine identifier matches the first machine identifier and that the second user identifier matches the first user identifier.

Example 30 includes the subject matter of Example 29, and wherein allowing the client computing device to access the data comprises transmitting a successful response to the client computing device.

Example 31 includes the subject matter of any of Examples 29 and 30, and wherein the first machine identifier is generated as a function of a unique key, wherein the unique key is unique to the combination of the client computing device and the secure enclave of the client computing device.

Example 32 includes the subject matter of any of Examples 29-31, and wherein the unique key comprises an enclave sealing key.

Example 33 includes the subject matter of any of Examples 29-32, and wherein binding the first machine identifier and the first user identifier to the application license comprises receiving the first machine identifier and the first user identifier from the client computing device.

Example 34 includes the subject matter of any of Examples 29-33, and wherein binding the first machine identifier and the first user identifier to the application license comprises transmitting a server challenge data item to the client computing device, wherein the machine identifier is further indicative of the server challenge data item.

Example 35 includes the subject matter of any of Examples 29-34, and wherein performing remote attestation of the secure enclave of the client computing device comprises receiving, via the secure connection, a measurement of the secure enclave; and verifying that the secure enclave is intact based on the measurement of the secure enclave.

Example 36 includes the subject matter of any of Examples 29-35, and wherein the measurement of the secure enclave is indicative of a security log associated with the secure enclave, wherein the security log is indicative of contents of the secure enclave and an order of creation of the secure enclave.

Example 37 includes a computing device comprising a processor; and a memory having stored therein a plurality of instructions that when executed by the processor cause the computing device to perform the method of any of Examples 19-36.

Example 38 includes one or more machine readable storage media comprising a plurality of instructions stored thereon that in response to being executed result in a computing device performing the method of any of Examples 19-36.

Example 39 includes a computing device comprising means for performing the method of any of Examples 19-36.

Example 40 includes a computing device for secure server access, the computing device comprising means for loading a license agent into a secure enclave established by a processor of the computing device; means for receiving, by the license agent, a request to access a remote server from an application of the computing device; means for performing, by the license agent, remote attestation of the secure enclave with the remote server via secure connection between the license agent and the remote server; means for authenticating, by the license agent, a user of the computing device; means for transmitting, by the license agent, a machine identifier and a user identifier to the remote server via the secure connection in response to authenticating the user, wherein the machine identifier identifies the computing device and the user identifier identifies the user of the computing device; and means for allowing, by the license agent, the application to access the secure connection with the remote server in response to authenticating the machine identifier and the user identifier.

Example 41 includes the subject matter of Example 40, and further including means for opening, by the license agent, the secure connection with the remote server in response to receiving the request to access the remote sever.

Example 42 includes the subject matter of any of Examples 40 and 41, and further including means for receiving, by the license agent, a successful response from the remote server in response to transmitting the machine identifier and the user identifier; wherein the means for allowing the application to access the secure connection in response to authenticating the machine identifier and the user identifier comprises means for allowing the application to access the secure connection in response to receiving the successful response.

Example 43 includes the subject matter of any of Examples 40-42, and further including means for generating, by the license agent, the machine identifier as a function of a unique key, wherein the unique key is unique to a combination of the secure enclave and the computing device.

Example 44 includes the subject matter of any of Examples 40-43, and wherein the unique key comprises an enclave sealing key.

Example 45 includes the subject matter of any of Examples 40-44, and wherein the means for generating the machine identifier further comprises means for generating the machine identifier as a function of a server challenge data item received from the remote server.

Example 46 includes the subject matter of any of Examples 40-45, and wherein the means for performing remote attestation of the secure enclave comprises means for generating, by the license agent, a measurement of the secure enclave; and means for transmitting, by the license agent, the measurement of the secure enclave to the remote server.

Example 47 includes the subject matter of any of Examples 40-46, and wherein the means for generating the measurement of the secure enclave comprises means for generating a measurement indicative of a security log associated with the secure enclave, wherein the security log is indicative of contents of the secure enclave and an order of creation of the secure enclave.

Example 48 includes the subject matter of any of Examples 40-47, and wherein the means for authenticating the user of the computing device comprises means for receiving user credentials from the user.

Example 49 includes the subject matter of any of Examples 40-48, and wherein the means for receiving the user credentials from the user comprises means for receiving the user credentials using a trusted I/O path of the computing device.

Example 50 includes a computing device for secure server access, the computing device comprising means for binding a first machine identifier and a first user identifier to an application license, wherein the first machine identifier identifies a particular combination of a client computing device and a secure enclave established by a processor of the client computing device and wherein the first user identifier identifies a particular user of the client computing device; means for opening a secure connection with the client computing device; means for performing remote attestation of the secure enclave of the client computing device via the secure connection; means for receiving a second machine identifier and a second user identifier from the client computing device via the secure connection; means for determining whether the second machine identifier matches the first machine identifier and whether the second user identifier matches the first user identifier; and means for allowing the client computing device to access data of the computing device via the secure connection in response to (i) performing the remote attestation of the secure enclave and (ii) determining that the second machine identifier matches the first machine identifier and that the second user identifier matches the first user identifier.

Example 51 includes the subject matter of Example 50, and wherein the means for allowing the client computing device to access the data comprises means for transmitting a successful response to the client computing device.

Example 52 includes the subject matter of any of Examples 50 and 51, and wherein the first machine identifier is generated as a function of a unique key, wherein the unique key is unique to the combination of the client computing device and the secure enclave of the client computing device.

Example 53 includes the subject matter of any of Examples 50-52, and wherein the unique key comprises an enclave sealing key.

Example 54 includes the subject matter of any of Examples 50-53, and wherein the means for binding the first machine identifier and the first user identifier to the application license comprises means for receiving the first machine identifier and the first user identifier from the client computing device.

Example 55 includes the subject matter of any of Examples 50-54, and wherein the means for binding the first machine identifier and the first user identifier to the application license comprises means for transmitting a server challenge data item to the client computing device, wherein the machine identifier is further indicative of the server challenge data item.

Example 56 includes the subject matter of any of Examples 50-55, and, wherein the means for performing remote attestation of the secure enclave of the client computing device comprises means for receiving, via the secure connection, a measurement of the secure enclave; and means for verifying that the secure enclave is intact based on the measurement of the secure enclave.

Example 57 includes the subject matter of any of Examples 50-56, and wherein the measurement of the secure enclave is indicative of a security log associated with the secure enclave, wherein the security log is indicative of contents of the secure enclave and an order of creation of the secure enclave.

The invention claimed is:

1. A method for secure server access, the method comprising:
    loading, by a computing device, a license agent into a secure enclave established by a processor of the computing device;
    binding, by the license agent, a machine identifier and a user identifier to an application license, wherein binding the machine identifier and the user identifier to the application license comprises transmitting the machine identifier and the user identifier to a remote server;
    receiving, by the license agent, a request to access the remote server from an application of the computing device in response to binding the machine identifier and the user identifier to application license;
    performing, by the license agent, remote attestation of the secure enclave with the remote server via secure connection between the license agent and the remote server;

authenticating, by the license agent, a user of the computing device;

transmitting, by the license agent, the machine identifier and the user identifier to the remote server via the secure connection in response to authenticating the user, wherein the machine identifier identifies the computing device and the user identifier identifies the user of the computing device; and allowing, by the license agent, the application to access the secure connection with the remote server in response to authenticating the machine identifier and the user identifier.

2. The method of claim 1, further comprising generating, by the license agent, the machine identifier as a function of a unique key, wherein the unique key is unique to a combination of the secure enclave and the computing device.

3. The method of claim 2, wherein the unique key comprises an enclave sealing key.

4. The method of claim 2, wherein generating the machine identifier further comprises generating the machine identifier as a function of a server challenge data item received from the remote server.

5. The method of claim 1, wherein performing remote attestation of the secure enclave comprises:

generating, by the license agent, a measurement of the secure enclave; and transmitting, by the license agent, the measurement of the secure enclave to the remote server.

6. The method of claim 5, wherein generating the measurement of the secure enclave comprises generating a measurement indicative of a security log associated with the secure enclave, wherein the security log is indicative of contents of the secure enclave and an order of creation of the secure enclave.

7. The method of claim 1, wherein authenticating the user of the computing device comprises receiving user credentials from the user using a trusted I/O path of the computing device.

8. The method of claim 1, further comprising opening, by the license agent, the secure connection with the remote server in response to receiving the request to access the remote sever.

9. The method of claim 1, further comprising:

receiving, by the license agent, a successful response from the remote server in response to transmitting the machine identifier and the user identifier;

wherein allowing the application to access the secure connection in response to authenticating the machine identifier and the user identifier comprises allowing the application to access the secure connection in response to receiving the successful response.

10. A method for secure server access, the method comprising:

binding, by a computing device, a first machine identifier and a first user identifier to an application license, wherein the first machine identifier identifies a particular combination of a client computing device and a secure enclave established by a processor of the client computing device and the first user identifier identifies a particular user of the client computing device;

opening, by the computing device, a secure connection with the client computing device;

performing, by the computing device, remote attestation of the secure enclave of the client computing device via the secure connection;

receiving, by the computing device, a second machine identifier and a second user identifier from the client computing device via the secure connection;

determining, by the computing device, whether the second machine identifier matches the first machine identifier and whether the second user identifier matches the first user identifier; and allowing, by the computing device, the client computing device to access data of the computing device via the secure connection in response to (i) performing the remote attestation of the secure enclave and (ii) determining that the second machine identifier matches the first machine identifier and that the second user identifier matches the first user identifier.

11. The method of claim 10, wherein the first machine identifier is generated as a function of a unique key, wherein the unique key is unique to the combination of the client computing device and the secure enclave of the client computing device.

12. The method of claim 11, wherein the unique key comprises an enclave sealing key.

13. The method of claim 10, wherein binding the first machine identifier and the first user identifier to the application license comprises transmitting a server challenge data item to the client computing device, wherein the machine identifier is further indicative of the server challenge data item.

14. The method of claim 10, wherein performing remote attestation of the secure enclave of the client computing device comprises:

receiving, via the secure connection, a measurement of the secure enclave; and verifying that the secure enclave is intact based on the measurement of the secure enclave.

15. The method of claim 14, wherein the measurement of the secure enclave is indicative of a security log associated with the secure enclave, wherein the security log is indicative of contents of the secure enclave and an order of creation of the secure enclave.

16. The method of claim 10, wherein allowing the client computing device to access the data comprises transmitting a successful response to the client computing device.

17. The method of claim 10, wherein binding the first machine identifier and the first user identifier to the application license comprises receiving the first machine identifier and the first user identifier from the client computing device.

* * * * *